UNITED STATES PATENT OFFICE.

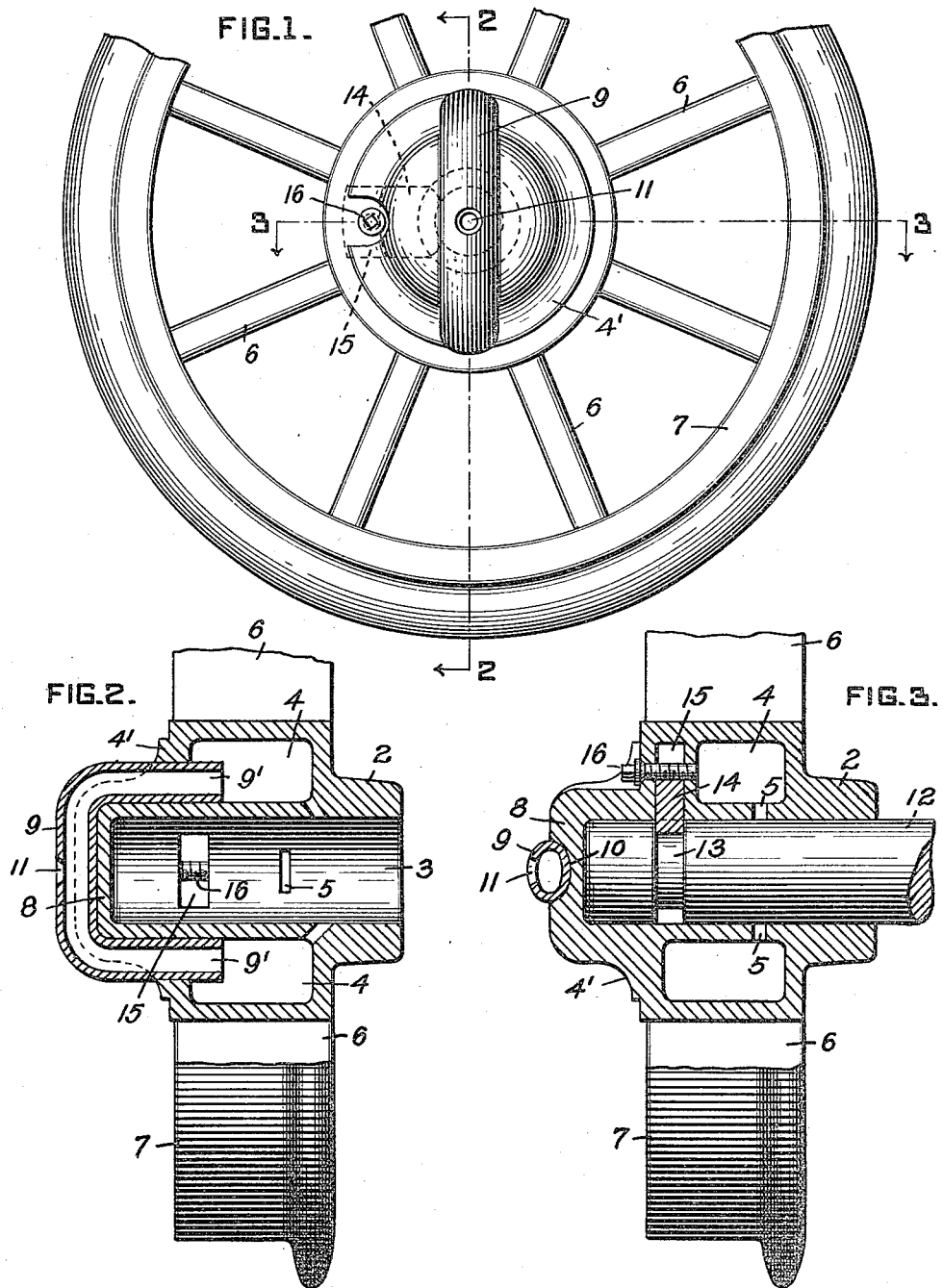

CHESTER D. SENSENICH, OF IRWIN, PENNSYLVANIA, ASSIGNOR TO IRWIN FOUNDRY & MINE CAR COMPANY, OF IRWIN, PENNSYLVANIA, A CORPORATION OF PENNSYLVANIA.

SELF-OILING WHEEL.

1,141,586.     Specification of Letters Patent.     Patented June 1, 1915.

Application filed March 25, 1915. Serial No. 16,996.

*To all whom it may concern:*

Be it known that I, CHESTER D. SENSENICH, a citizen of the United States, and resident of Irwin, in the county of Westmoreland and State of Pennsylvania, have invented certain new and useful Improvements in Self-Oiling Wheels, of which the following is a specification.

This invention has particular reference to self-oiling wheels commonly used on mine cars, and the primary object is to provide efficient and durable means for entering the oil in the chamber or reservoir of the wheel hub.

The invention is embodied in a "cap" wheel, *i. e.*, a wheel having the extremity of its hub closed, and hence inclosing the axle or journal. The hub is commonly formed of cast iron and is so cast as to securely and permanently fix the filling pipe thereto, the pipe extending across the outer extremity of the closed hub end with its extremities entered in the oil chamber. While the pipe is located at the outer end of the hub, and hence in an exposed position, the partial embedding thereof in the metal of the hub strongly reinforces it, and as the pipe is commonly formed of ductile steel or iron it will withstand hard usage without being either broken or knocked loose.

In the accompanying drawings, Figure 1 is an elevation of the outer side of a self-oiling mine car wheel embodying the invention, and Figs. 2 and 3 are cross-sections taken on lines 2—2 and 3—3, respectively, of Fig. 1.

Referring to the drawings, hub 2 of the wheel, commonly formed of cast iron, is formed with the usual bearing cavity 3 and encircling oil chamber 4, the latter communicating with the bearing cavity through ports 5. It is usual practice to have integral spokes 6 radiate from the cored hub and carry at their outer ends the rim 7. The bearing cavity 3 does not extend through the hub, the end of the latter at the front of the wheel being closed by wall 8 as is usual in closed hub or so-called "cap" wheels.

Embracing the cap end of the hub is the U-shaped filling pipe 9 which has its open ends 9' extending through front wall 4' of chamber 4 at opposite sides of the bearing cavity. Pipe 9 is ordinarily formed of ductile steel or iron and is suitably held in position when the wheel is cast, the arrangement being such that the pipe is partially embedded in the metal of the hub cap, and with chamber 4 cast around the pipe ends so that the latter are projected thereinto. The pipe is thus caused to lie in a groove-like depression 10 in the outer surface of the cap, whereby the hub and the pipe are rigidly and permanently united in such manner that each reinforces the other. The pipe is preferably flattened, particularly at the outer side of the hub extremity, as shown in Fig. 3, thereby increasing its hold in the cast metal and slightly decreasing the projection of the pipe from the hub extremity. A filling hole 11 in the outer side of the pipe, preferably in line with the wheel axis, provides for the introduction of oil from a spouted can, the oil flowing into chamber 4 through that branch of the pipe which happens to be disposed downwardly when the oil is being introduced.

With the filling pipe cast in place and at least partially embedded in the hub cap, it is so permanently and securely held as to withstand the rough usage to which wheels of this type are ordinarily subjected.

While the invention may be applied to wheels provided with various means for fastening them on their axles or journals, the means here shown is that commonly used in the Lobdell wheel wherein axle 12 is formed with an encircling groove 13 and entered in the latter is the flat key 14. The key is confined in cavity 15 of the hub by screw bolt 16, the inner edge of the key being curved to fit groove 13. With the key in place as in Figs. 1 and 3, the wheel is securely held without interfering with its rotation on axle 12.

I claim:

1. A self-oiling car wheel having a cast-metal hub formed with a closed-end bearing cavity, the hub being cast with an oil chamber extending around and in communication with said cavity, and a tube extending around the closed extremity of the hub and with the ends of the tube entered in the oil chamber with the pipe secured in position by casting the metal of the hub in embracing engagement therewith, the tube formed with a filling opening.

2. A self-oiling car wheel having a cast-metal hub formed with a closed-end bearing cavity and with an oil chamber extending around and in communication with the cavity, a U-shaped tube extending around the closed extremity of the hub with its ends entered in the oil chamber, the metal at the exterior of the closed hub end being cast in embracing engagement with the tube and thereby seating and securing the tube in the hub extremity, said tube having a filling opening.

In testimony whereof I affix my signature in presence of two witnesses.

CHESTER D. SENSENICH.

Witnesses:
ADAM SCHADE,
BAYARD CARUTHERS.

Copies of this patent may be obtained for five cents each, by addressing the "Commissioner of Patents, Washington, D. C."